United States Patent [19]

Allen

[11] 4,429,188

[45] Jan. 31, 1984

[54] TELEPHONE CALL SCREENER

[76] Inventor: Thomas E. Allen, 91 N. Mar Vista Ave. #5, Pasadena, Calif. 91106

[21] Appl. No.: 273,618

[22] Filed: Jun. 15, 1981

[51] Int. Cl.³ ............................................. H04M 1/66
[52] U.S. Cl. ............................... 179/84 C; 179/84 SS
[58] Field of Search ................ 179/84 C, 84 R, 84 A, 179/84 SS

[56] References Cited

U.S. PATENT DOCUMENTS

| 3,514,548 | 5/1970 | De Meo | 179/84 C |
| 4,074,078 | 2/1978 | Jansen | 179/84 C |
| 4,266,098 | 5/1981 | Novak | 179/84 C X |

FOREIGN PATENT DOCUMENTS 489807  1/1976  Australia ........................... 179/84 C

*Primary Examiner*—G. Z. Rubinson
*Assistant Examiner*—James L. Dwyer
*Attorney, Agent, or Firm*—Christie, Parker & Hale

[57] ABSTRACT

A telephone call screener discriminates between desired and undesired incoming telephone calls. Desired calls are signaled by use of a two-digit code known only to persons selected by the user. The first digit of the code refers to the number of silence gaps between calling tones or rings that the calling party has to wait before entering a second digit of the code from one of the ten numbers on the touch tone or rotary dial on the telephone used to place the call. An incoming call is first detected and electronically answered, after which the output of a sine wave generator is periodically transmitted over the open telephone line to generate false calling tones simulating the periodic audible ringing sequence of a conventional telephone. An enabling circuit detects the correct code being signaled only during the proper silence gap in the false calling tone sequence. Either a touch tone decoder circuit or a rotary dial detector circuit is enabled to generate an output for activating a transducer, such as a bell or a light, to indicate that the desired call has been received. If the transducer is activated, the false calling tone sequence is extended to provide additional time for answering the phone, and when the extended sequence ends, the call is terminated. Even if the proper code is not detected during the correct silence gap, the false calling tone generator continues to produce false calling tones either until the calling party hangs up or until a maximum number of false calling tones is generated, after which the screener automatically terminates the cycle and resets for receiving the next incoming call.

21 Claims, 6 Drawing Figures

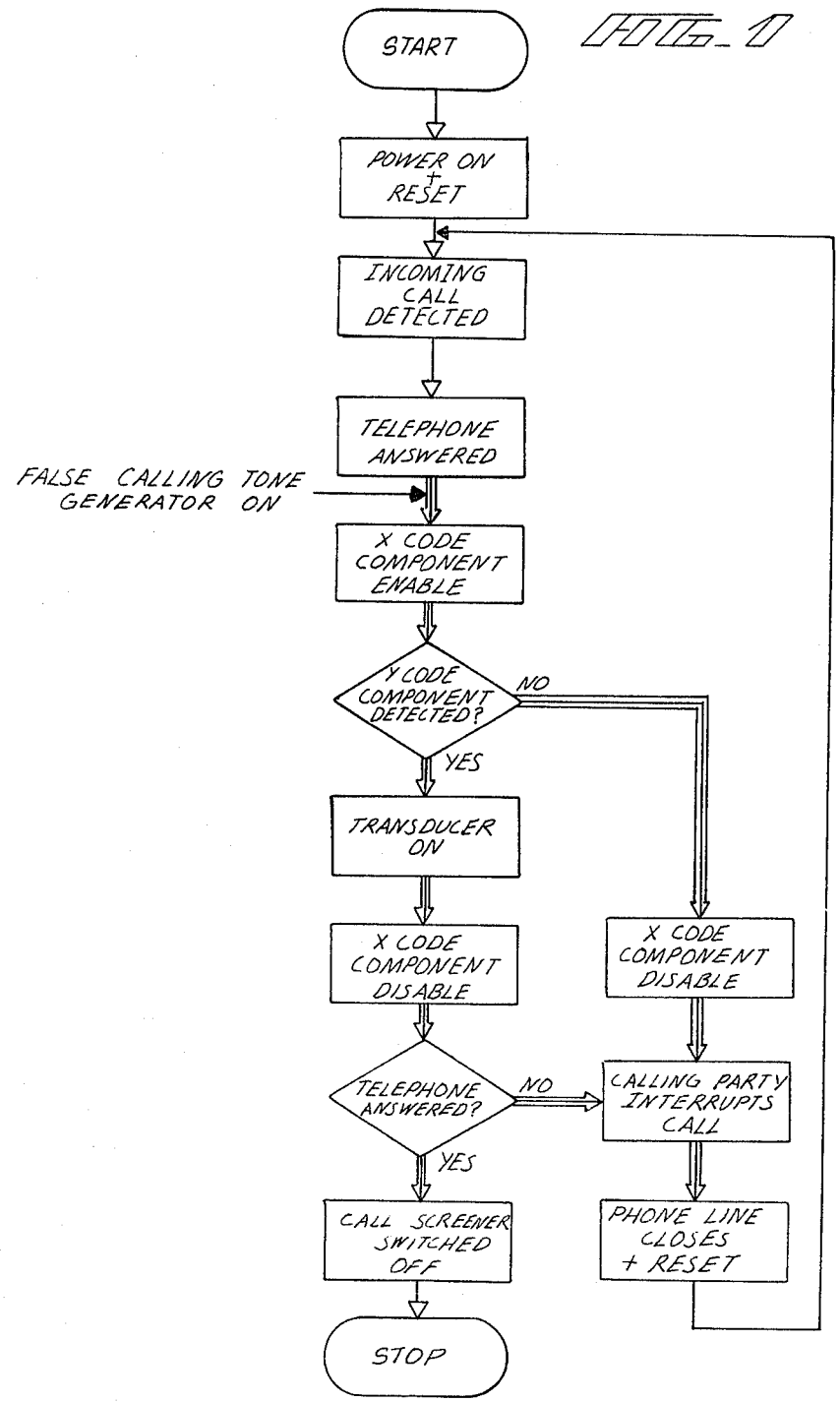

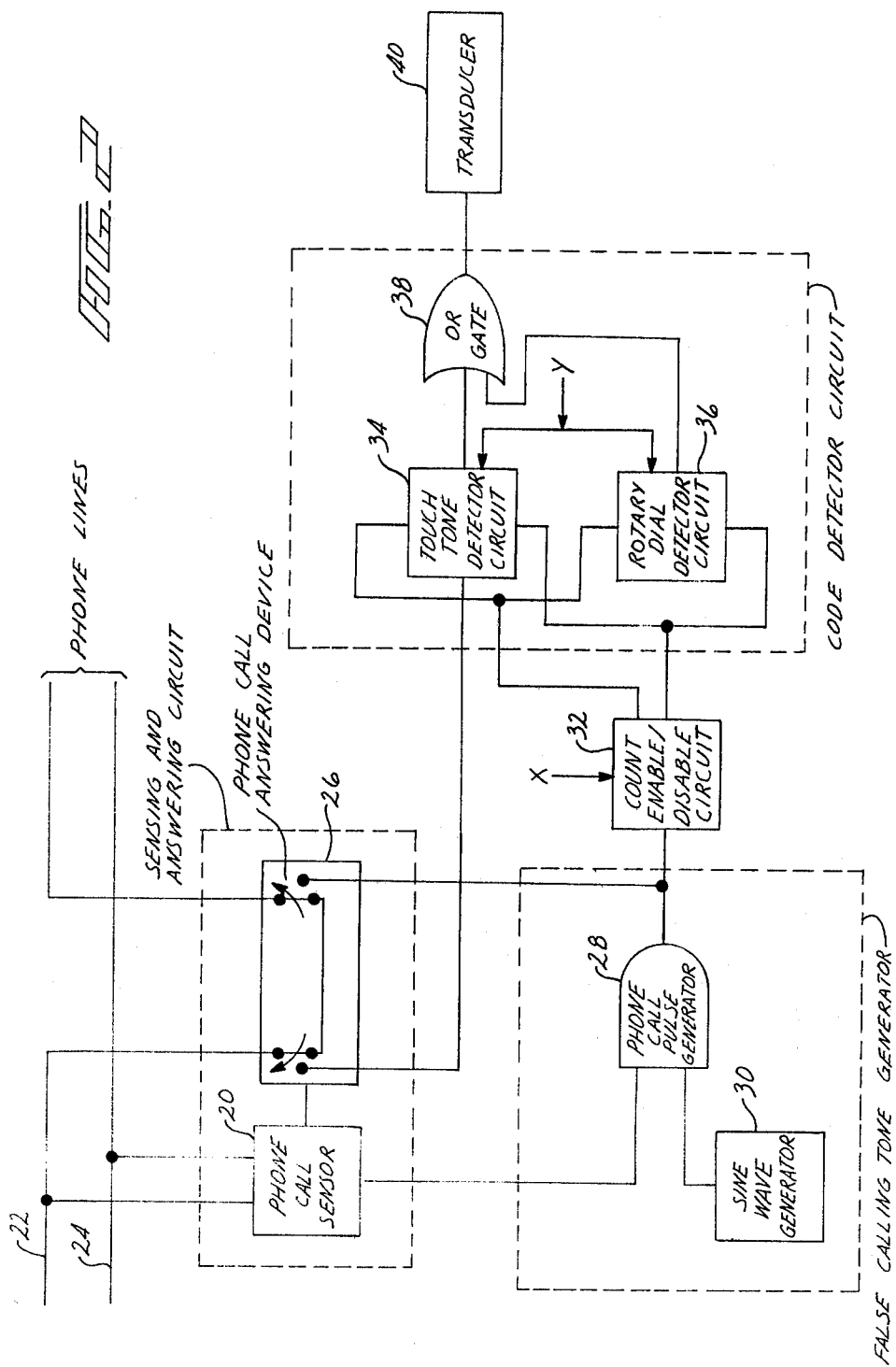

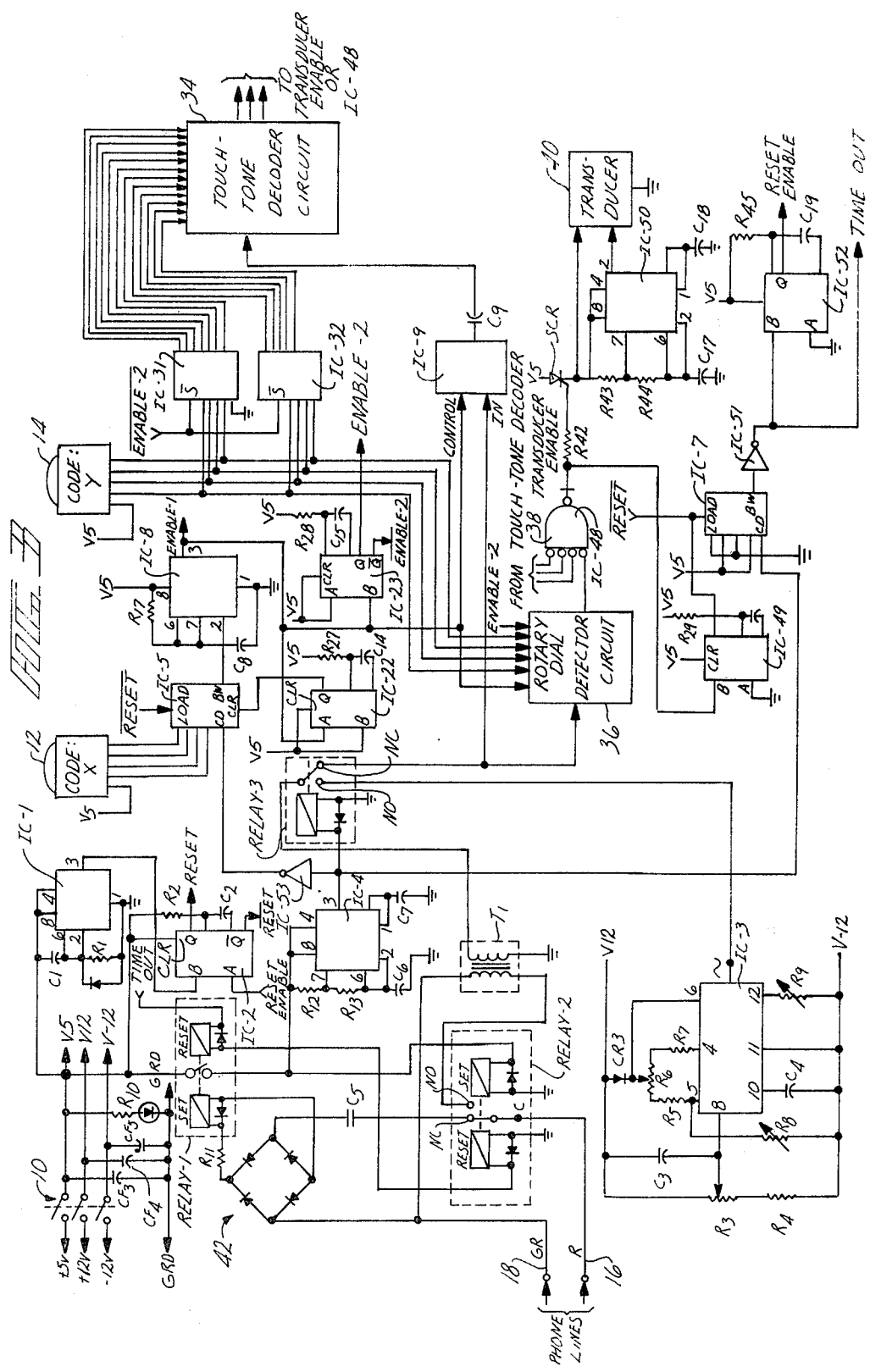

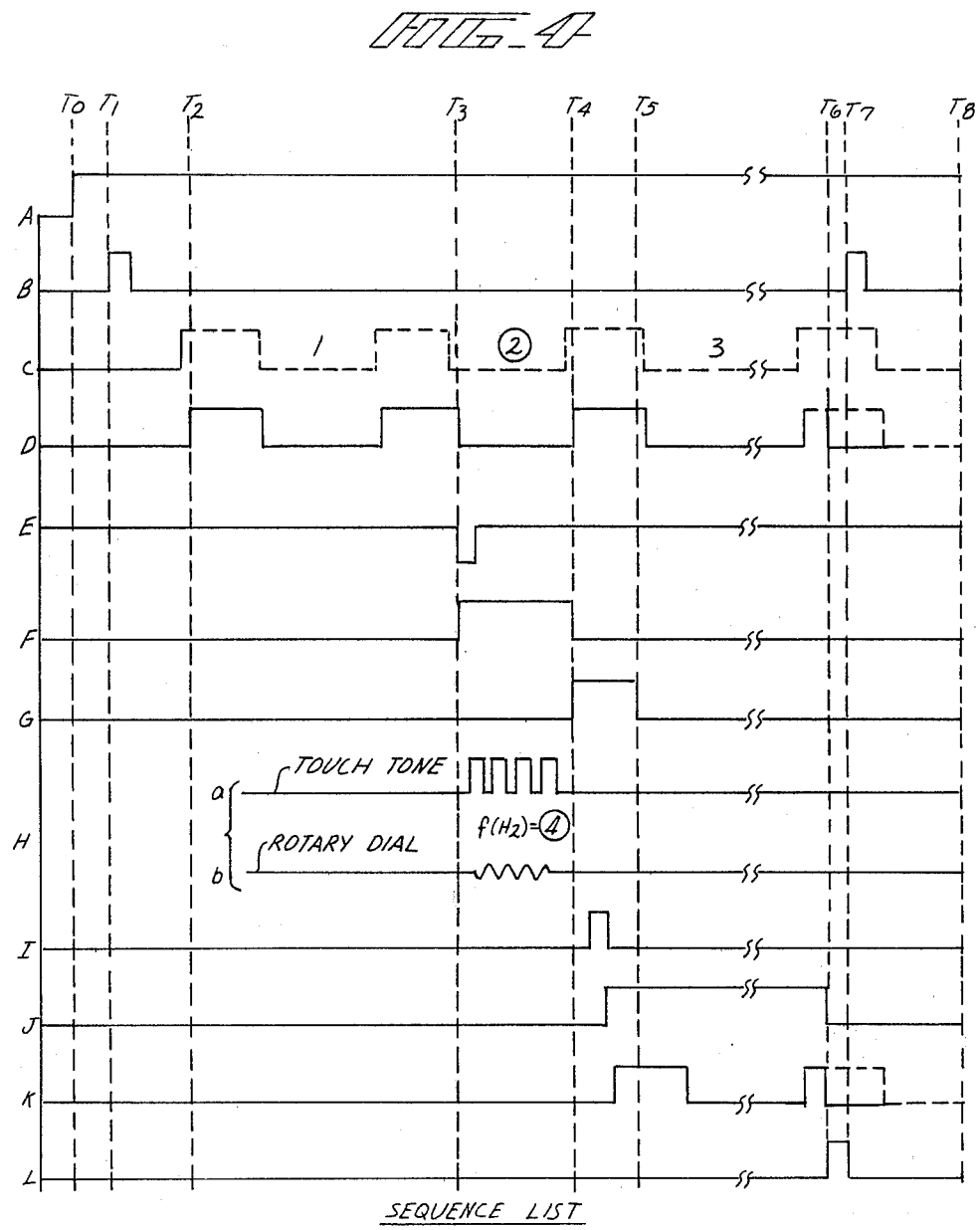

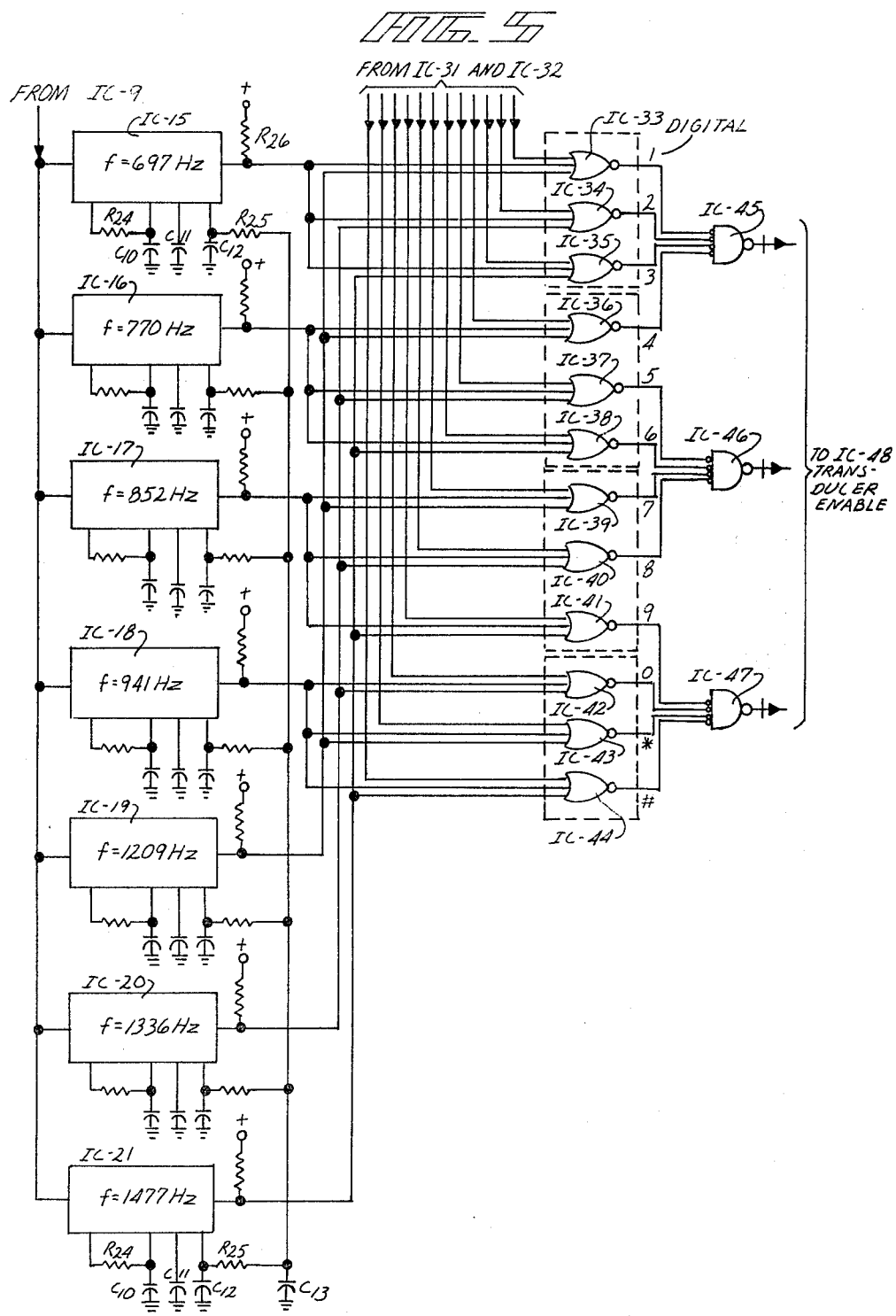

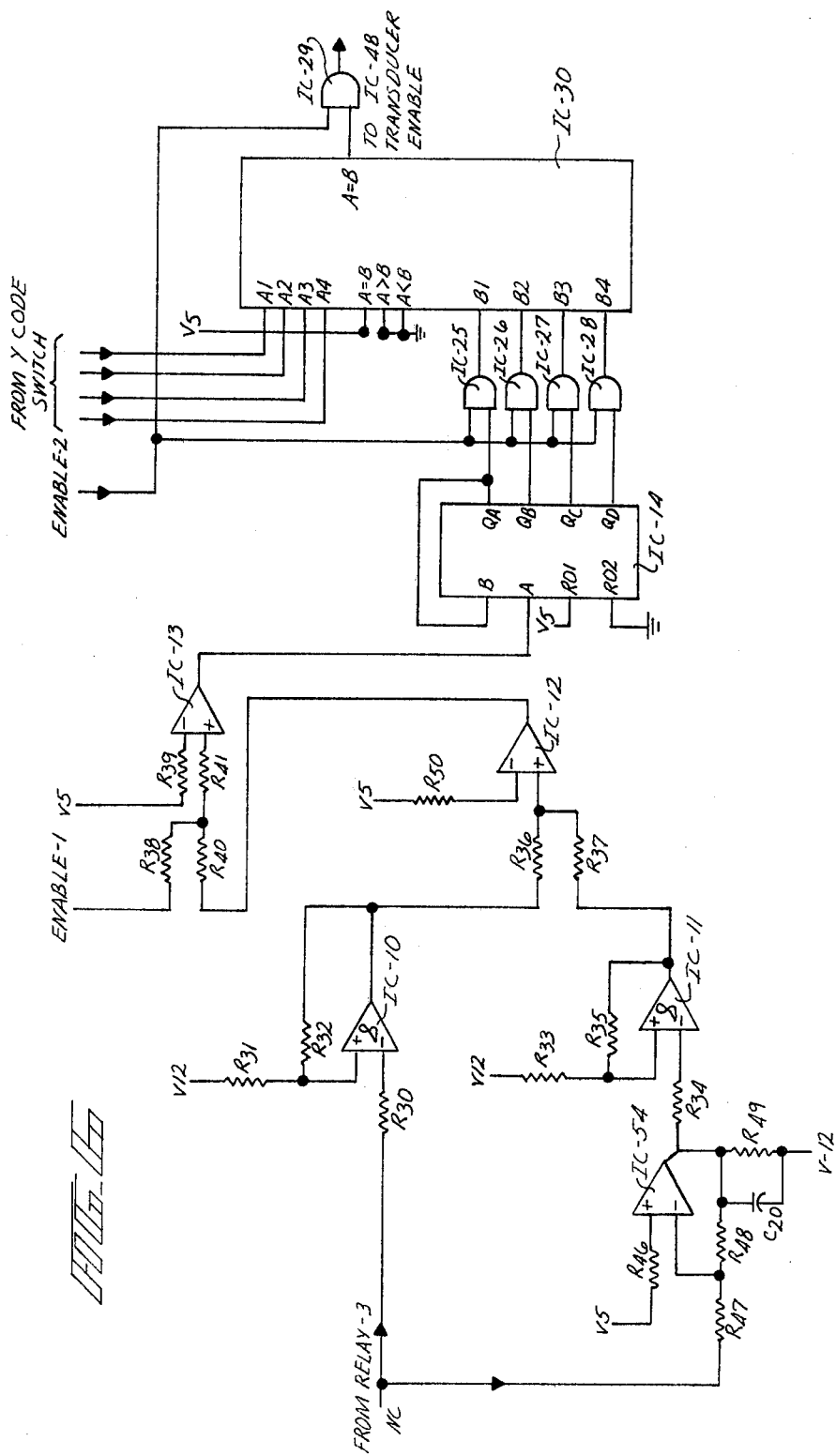

TELEPHONE CALL SCREENER

CROSS REFERENCE

This application is based on my Disclosure Document No. 082,261, filed July 5, 1979.

BACKGROUND OF THE INVENTION

1. Field of the Invention

This invention relates generally to telephone answering devices, and more particularly to a system for screening incoming calls to discriminate between desired and undesired calls.

2. Description of the Prior Art

Telephone users today have a variety of systems for answering incoming calls. For example, telephone answering devices are commonly used to automatically answer the telephone with announced instructions and then record a message from the caller. These answering devices can be expensive, and are used principally for answering the telephone when the party being called is absent.

There are many situations at home and in an office where the party being called is present but would like to have the incoming telephone calls screened, to avoid answering wrong numbers and to answer only those calls that might be important while avoiding other calls. Answering services are expensive and more appropriate for business use. They are not practical for use with a home phone to screen incoming calls. Telephone answering devices also are not practical in many cases for screening incoming calls.

Some telephone screening devices have been proposed for discriminating between desired and undesired incoming calls. Some of these devices are activated by an encoded signal from the caller to indicate to the party being called the presence of a desired call. One of these screening devices, disclosed in U.S. Pat. No. 4,074,078 to Jansen, requires use of a hand-held key device such as a beeper issued by the user to each person from whom it may be desirable to receive telephone calls. The caller carries the beeper and uses it to emit an audible tone of a particular frequency detected by the phone call screener to indicate the presence of a desired call. Such an arrangement can be impractical because it can be expensive to issue separate beepers to various persons who may call. There can also be instances in which the person desiring to call may not have the beeper at hand.

Other telephone screening devices are not totally desirable because callers are aware that a screening device is attached to the receiving telephone. For example, the screening device disclosed in U.S. Pat. No. 3,514,548 to De Meo mechanically lifts the receiver and if the proper code is not transmitted, the receiver hangs up, thus terminating the call. This is not only discourteous but also informs callers that the incoming calls are being screened. There are many instances where a person wants callers (other than those from whom calls are considered important) to be totally unaware that incoming calls are being screened.

SUMMARY OF THE INVENTION

This invention provides a telephone call screener in which the dial of the telephone from which the call is placed is used to provide a code signal to the receiving telephone to indicate to the receiving party that a desired call is present on the line. In one embodiment, a two-number code is used, the first number referring to the number of silence gaps or rings that the caller must wait before entering a second number by activating any one of the ten numbered switches on the telephone dial from which the call is placed. The incoming call is initially detected, answered and false calling tones (simulating the ringing tones of a conventional telephone) are then transmitted over the open telephone lines to the caller. The caller listens to the false calling tones and if he or she activates the proper second number of the code at the proper time during the false calling tone sequence, the telephone call screener indicates that a desired call is on the line. When the correct code is received, the telephone call screener produces a signal that activates a transducer, such as a bell or a light, etc., alerting the called party that the incoming call is from a party who has signaled the proper code. The telephone will continue to produce false calling tones (up to a limit) and will not activate the transducer if the proper two-number code is not signaled. Provisions are made for receiving the predetermined code from either touch tone telephones or rotary dial telephones.

Thus, a person knowing the code can signal the proper code from any telephone, without the need for special signaling equipment such as beepers; and the false calling tone generator keeps the caller totally unaware that a screening apparatus is attached to the receiving telephone.

These and other aspects of the invention will be more fully understood by referring to the following detailed description and the accompanying drawings.

DRAWINGS

FIG. 1 is a schematic flow diagram illustrating a sequence of steps in the operation of a telephone call screener according to the principles of this invention;

FIG. 2 is a block diagram illustrating in general the various functions of the telephone call screener;

FIG. 3 is a detailed electrical circuit diagram of the telephone call screener;

FIG. 4 is a schematic diagram illustrating the timing sequence of signals generated by the circuit of FIG. 3;

FIG. 5 is an electrical circuit diagram of a touch tone decoder circuit; and

FIG. 6 is an electrical circuit diagram of a rotary dial detector circuit.

DETAILED DESCRIPTION

This invention provides a telephone call screener for electronically monitoring and answering incoming calls on a telephone (not shown) and for discriminating between desired and undesired incoming calls. The telephone call screener contains electronic components contained in a small housing (not shown) that can be attached to or placed adjacent to a standard telephone. The telephone call screener is purely electronic in the sense that no mechanical attachment to the telephone receiver is required for operating it. The housing of the telephone call screener includes an ON/OFF switch 10 (see FIG. 3) and adjustable X and Y code thumb-wheel switches 12 and 14 (see FIG. 3) for use in selecting a desired secret two-digit code that operates the screener. The telephone call screener circuitry includes electrical leads 16 and 18 (see FIG. 3) for being connected directly to the red and green wires of the telephone. The screener also includes a connection (not shown) for an electrical outlet (115 VAC/60 Hz). A power supply (not shown) provides the voltages indicated in the schematics of FIGS. 3, 5 and 6, described below.

The two thumb-wheel switches 12 and 14 are used to select the two X and Y components of the code used in operating the screener. Each component of the code can be one of the digits 1 through 10, and a unique combination of these two digits, as selected by the user, becomes the secret code for use in operating the telephone call screener. For example, the X and Y components of the code can be the digits 2 and 4, in that order, in which case the user initially sets the X code thumb-wheel 12 and the Y code thumb-wheel 14 to the digits 2 and 4, respectively. The user then discloses the preset code only to those persons from whom he or she wants to receive incoming telephone calls.

Referring to the preset X, Y code, the first digit, X, refers to the number of silence gaps within the calling tones of the receiving telephone that the caller must wait for before entering the second digit, Y, of the code. The second digit refers to any one of the ten numbers on a touch tone or rotary dial of the telephone from which the call has been placed. In the illustrated example in which the X, Y code consists of the numbers 2, 4, the caller waits for the second silence gap in the calling tones or rings of the receiving telephone, and during the second silence gap the caller then presses the number 4 button, if calling from a touch tone telephone, or the caller dials the number 4 if calling from a telephone with a rotary dial.

FIG. 1 is a schematic flow diagram illustrating the general sequence of steps in the operation of the telephone call screener according to this invention. After the desired X, Y code is preset by the user, the telephone screener power is switched ON and all necessary electronic components of the screener, such as timers and counters, are reset. An incoming telephone call is then detected, after which operation of the telephone call screener is triggered, for electronically answering the telephone. After the telephone is answered, a false calling tone is transmitted through the open telephone lines, simulating the periodic audible calling tones of a conventional telephone. (The double lines of the arrows shown in the flow diagram of FIG. 1 illustrate those portions of the sequence of operation during which the false calling tone generator is in operation.) The screener is next enabled during the proper silence gap in the false call tones, as controlled by the X component of the code, to detect the Y component of the code. If the proper X, Y combination has been selected by the caller, a transducer is triggered to alert the party being called that a desired call is on the line. After the proper silence gap in the false calling tone sequence has passed, the second silence gap in the example referred to above, the X component of the circuitry is disabled to prevent receiving any further input signals. If the received party answers the telephone, the telephone call screener is manually switched off to switch the open phone line to the telephone receiver. If the telephone is not answered by the receiving party, the screener automatically closes the telephone line either after the calling party interrupts the call by hanging up the phone, or after a maximum number of false calling tones are produced. The length of the calling tone sequence can be extended if the calling party enters the correct code. Counters, timers, etc. in the screener circuitry are then reset in preparation for detecting the next call. If the proper Y code is not detected during the proper silence gap, the X component of the circuitry is disabled so that the transducer cannot be activated. The screener then automatically terminates the call either after a fixed number of false calling tones are produced, or after the calling party interrupts the call by hanging up the phone. The circuitry is then reset in preparation for detecting the next call.

FIG. 2 is a block diagram illustrating the basic functions of the telephone call screener. The functions of each portion of the block diagram are described in greater detail below with respect to the circuit diagram of FIG. 3. A telephone call sensing circuit 20 is connected across the telephone lines 22, 24 for detecting the presence of an incoming telephone call. A voltage level detecting device is sufficient to detect whether an incoming call is present. The telephone call sensor produces an output for triggering a telephone call answering device 26 to electronically "answer" the telephone once a call has been detected. The answering device is connected to the telephone lines, and once an incoming call is detected, the answering device is connected across the open telephone lines. The use of a relay (mechanical or electrical) is sufficient to open and close the line. At the time when the telephone answering device is activated, it enables a phone call pulse generator 28 that puts on the telephone line a series of periodic pulses from a sine wave generator 30. The pulses from the sine wave generator are, in effect, a series of false calling tones that simulate the audible periodic ringing tones of a conventional telephone, leading the caller to believe that a conventional calling tone sequence is being produced in the receiving telephone.

The output from the answering device also triggers a count enable/disable circuit 32 that receives the preset X code input. The input signal from the setting of the X code operates a counter that, in effect, counts the number of false calling tones produced by the false calling tone generator. When the counter circuitry determines that the preselected silence gap in calling tone sequence has been reached, it generates an output for enabling the preselected Y code input to be received during the selected silence gap. After the preselected silence gap has passed, a disabling signal is generated to prevent any further Y code input signals from being received during the rest of the calling tone sequence.

The preselected Y code input can be detected whether the caller is calling from a telephone with a touch tone dial or a rotary dial. A touch tone detector circuit 34 and a rotary dial detector circuit 36 both receive input signals representative of the preselected Y code. If the caller enters the correct Y code on a touch tone telephone dial, when the touch tone detector circuit is enabled during the correct silence gap in the calling tone sequence, the correct Y input signal is detected by the touch tone detector circuit. On the other hand, if the caller enters the correct Y code on a rotary dial telephone, when the rotary dial detector circuit is enabled during the correct silence gap in the calling tone sequence, the correct Y input signal is detected by the rotary dial detector circuit. A frequency discriminator (filter) can be used for the detection of the frequency-dependent touch tone telephone generated signals, and a counter can be used for detection of the series of pulses from the rotary dial type telephone. An OR gate 38 receives outputs from either the touch tone or the rotary dial detector circuits and produces an output fed to a transducer 40 for being activated to indicate that the proper X, Y code combination has been entered by the caller.

Detailed operation of a presently preferred telephone call screening arrangement, according to principles of this invention, will be understood best by referring to the schematic electrical diagram of FIG. 3. FIG. 4 illustrates the time histories of various timing signals generated by the circuitry of FIG. 3.

Referring to FIG. 3, when the power ON/OFF switch 10 is switched ON, a monostable multivibrator IC-1 is triggered, producing a delayed power ON signal for allowing the power supply to reach its maximum power output. The multivibrator IC-1 also triggers another multivibrator IC-2 for resetting count-down counters IC-5 and IC-7, in this way bringing the phone call screener to the standby state, ready to detect the next incoming telephone call. Signal A in FIG. 4 represents the power ON signal, and signal B in FIG. 4 represents a reset signal applied to counters IC-5 and IC-7.

With the power ON, the telephone lines are monitored continuously and without interference by routing the potential on the line through a relay, RELAY-2. The DC component (−48 VDC) of the potential on the line routed through the RELAY-2 is filtered by a capacitor $C_5$. The incoming signal then passes to a full-wave rectifier 42 having its output connected to a relay, RELAY-1, through a resistor $R_{11}$. In the absence of an AC signal, RELAY-1 does not have a signal across it. If and only when an incoming telephone call arrives, after the DC component is filtered out by the capacitor $C_5$, the AC signal that normally activates the ringer on the telephone (100 Vpp) is full-wave rectified by the rectifier 42 and dropped down by the resistor $R_{11}$ to energize RELAY-1 and move its contact to the set position.

With RELAY-1 closed, the RELAY-2 gets set and switched to its normally open state in which the telephone lines have been opened, i.e., the call is answered by applying to the telephone lines a 600 ohm matching impedance of the primary coil of a transformer $T_1$ which also permits complete isolation between the telephone lines and the telephone call screener.

At the same time the RELAY-2 was opened, an astable multivibrator IC-4 is triggered to start a number of sequences. The astable multivibrator IC-4 has an ON/HIGH state or 33% duty cycle oscillation equal to two seconds, versus a four second OFF/LOW state (frequency equals 0.1668 Hz). The multivibrator IC-4 generates an output consisting of a pulse train that energizes a relay, RELAY-3, which in effect, is a switch that constantly moves between a transmitting state and a receiving state. In its transmitting state, its contact is in the normally open position, when the output from the multivibrator IC-4 is in the ON/HIGH state. In its receiving state the contact is in the normally closed position when the output from the multivibrator IC-4 is in the OFF/LOW state. The transmitting state of the RELAY-3 consists of a series of pulses two seconds in duration with four-second intervals. When the output of the multivibrator IC-4 activates the RELAY-3 to switch its contact to the transmitting state, the output of a 20 Hz sine wave oscillator IC-3 is periodically connected across the secondary coil of the transformer $T_1$. The sine wave oscillator produces a sound that duplicates the telephone company calling tone signal. This transfers into the open telephone lines a periodic audible frequency that simulates the conventional ringing or calling tones of a conventional telephone, thereby producing a "false calling tone". During the four-second intervals between the pulses generated during the receiving state of RELAY-3, the output of the sine wave oscillator is not applied to the open telephone lines, producing "silence gaps" in the false calling tone sequence. The signal C in FIG. 4 represents the calling tones of an incoming call on the telephone lines, and the signal D represents the false calling tone signal.

The output pulses from the astable multivibrator IC-4 also are used to clock down an up/down counter IC-7 having its inputs hard wired so as to be loaded each time with the same number of counts, preferably, ten counts. The output of the counter IC-7 passes through an inverter IC-51 and produces a TIME OUT pulse (signal L, FIG. 4) for resetting RELAY-1 and RELAY-2 when the counter counts down to zero. The purpose is to provide a calling tone sequence with a maximum number of ten calling tones after which the cycle of the telephone call screener is terminated. That is, the telephone screener "hangs up" the telephone after a maximum of ten rings at the receiving telephone if the telephone is not answered. The output of the counter IC-7 also triggers a pulse generator IC-52 that generates a RESET ENABLE pulse that causes the multivibrator IC-2 to generate a RESET signal for bringing the phone call screener to its original standby state.

The pulses from the astable multivibrator IC-4 also are used to clock down an up/down counter IC-5. The pulses from the astable multivibrator are first inverted by an inverter IC-53 before being fed to the counter IC-5. The counter IC-5 was loaded with the setting of the X code thumb-wheel switch 12. The switch 12 has four output wires with binary voltage levels, producing an output in the form of four parallel bits of information equivalent to a number that is loaded into the counter IC-5 by multivibrator IC-2 during the RESET sequence. The number can represent any one of the calling tones in the false calling tone sequence. The setting of the switch produces a unique output that identifies the preset value of the X code setting, and to the caller the X code represents the number of a particular silence gap in the calling tone sequence. For each RESET cycle, the setting of the X code switch is reloaded into the counters IC-5 and IC-7 by the RESET signal from the multivibrator IC-2.

When the couner IC-5 reaches its lowest count, zero, it generates a negative pulse (signal E, FIG. 4) that triggers a monostable oscillator IC-8 that, in turn, produces an output signal, ENABLE-1 (signal F, FIG. 4), for controlling either the touch tone decoder circuit 34 or the rotary dial detector circuit 36. The secondary coil of the transformer $T_1$ is connected to the touch tone decoder circuit through the RELAY-3 and through an analog switch IC-9 having a normally open state. Only when the ENABLE-1 signal is produced will the analog switch IC-9 switch to its closed state to enable operation of the touch tone decoder circuit. The secondary coil of the transformer also is connected to the rotary dial detector circuit 36 through the RELAY-3 and through components IC-10 and IC-54 (see FIG. 6) described below. Only when the ENABLE-1 signal is produced will the AND gate IC-13 produce an output that enables operation of the rotary dial detector circuit. The ENABLE-1 signal is thus representative of a "time window" only during which the touch tone and rotary dial detector circuits are enabled to receive Y code inputs being entered by the caller. In the example above, in which the selected X, Y code is 2, 4 (i.e., the number 4 being entered on the dial during the second silence gap in the calling tone sequence), the ENABLE-1 signal is generated only during the second silence gap in the false calling tone sequence. It is only during that time gap or window that the touch tone decoder circuit 34 and the rotary dial detector circuit 36 are enabled to receive Y code inputs from the telephone line. This prevents the phone call screener circuitry from being disrupted by false codes being entered on the line at other times during the calling tone sequence.

The ENABLE-1 signal also is connected to the input of an oscillator IC-22 and the input of an oscillator IC-23. When the oscillator IC-22 is triggered by the falling edge of ENABLE-1, it clears the counter IC-5, so that only one ENABLE-1 signal will be generated during each complete operational cycle of the phone call screener. The counter IC-5 does not get reloaded again until the phone call screener is reset.

The oscillator IC-23 generates two outputs, one referred to as ENABLE-2 (signal G, FIG. 4), and an inverted ENABLE-2 signal which resets a pair of 8×32 PROM's IC-31 and IC-32 which, in turn, address the touch tone decoder circuit 34, schematically illustrated in greater detail in FIG. 5. The PROM's are loaded with all of the possible combinations of the Y code. The ENABLE-2 signal is produced when the trailing edge of the ENABLE-1 signal occurs so that the ENABLE-2 signal does not activate its associated circuitry until the "time window" established by ENABLE-1 has terminated. The output signal ENABLE-2 from the oscillator IC-23 also is connected to an AND gate IC-29 and to AND gates IC-25 through IC-28 in the rotary dial detector circuit 36, schematically illustrated in greater detail in FIG. 6.

The thumb-wheel switch 14 which presets the Y code input generates a digital output signal representative of a selected one of any of the ten digits on a telephone dial. The digital output representative of the selected Y code addresses the PROM's IC-31 and IC-32. If the calling party is using a telephone with a touch tone type dial, and the calling party presses one of the buttons on the touch tone dial, a dual-frequency signal (signal H (a), FIG. 4) is generated. This signal is sensed by the touch tone decoder circuit only while the analog switch IC-9 is enabled by the ENABLE-1 signal. The dual-frequency input signal from the touch tone telephone is passed to the touch tone decoder circuit, through the analog switch IC-9, when the RELAY 3, is in the receiving position (LOW/OFF state) for receiving the telephone line input.

Referring to FIG. 5, the touch tone decoder circuit includes a series of phase-locked loops IC-15 through IC-21 which, in effect, provide an analog-to-digital conversion of the touch tone frequency for discriminating the two touch tone frequencies. The output of two of the phase-locked loops drops low when the two frequencies are detected, duplicating the touch tone digit selected by the calling party. This information is coupled to the NOR gates IC-33 through IC-44, along with the information coming from the PROM's IC-31 and IC-032, consisting of seven parallel bits from the PROM IC-31 and five parallel bits from the PROM IC-32, thus screening the incoming information and only allowing a selected output. The outputs of the NOR gates are connected to three OR gates IC-45 through IC-47 for producing three output signals indicating whether the touch tone frequency entered by the caller matched the frequency of the touch tone digit selected by the Y code input. Only one of the NOR gates IC-33 through IC-44 will be enabled by the unique bit pattern generated by the PROMS. If the correct digit is detected, a pulse is passed to all three OR gates IC-45 through IC-47, generating a TRANSDUCER ENABLE signal (signal I, FIG. 4) at the output of an OR gate IC-48. The TRANSDUCER ENABLE signal triggers a pulse generator IC-49 which reloads the counter IC-7. This extends the period of time that it takes before the TIME OUT pulse is generated, avoiding the possibility of the phone call screener being shut off prematurely while the transducer is being activated.

If the incoming call is from a telephone with a rotary dial, then the input received by the analog switch IC-9 is in the form of a stream of pulses (signal H (b), FIG. 4) that are counted and compared in the rotary dial detector circuit 36. Referring to FIG. 6, the rotary dial detector circuit includes a Schmitt trigger IC-10 which senses positive pulses from the rotary dial input and generates a pulse. The negative pulses from the rotary dial input are inverted by a negative peak detector IC-54, and again a pulse is generated by a Schmitt trigger IC-11. Outputs from the two Schmitt triggers are fed to an AND gate IC-12, the output of which is coupled to another AND gate IC-13, along with the ENABLE-1 signal. The output from the AND gate IC-13 is fed to a counter IC-14, and only when the AND gate IC-13 is enabled by the ENABLE-1 signal are the series of pulses from the rotary dial counted by the counter IC-14. The counter IC-14 generates four outputs connected to four AND gates IC-25 through IC-28, together with the ENABLE-2 signal. Outputs of the AND gates are coupled to a four-bit magnitude comparator IC-30 which also receives four parallel bits of information from the Y code switch. The set B from the AND gates IC-25 through IC-28 is compared with the set A from the Y code input. It is not desirable that set B be changing when the two sets are compared. Hence, only when the stream of incoming pulses has stopped (ENABLE-1 goes LOW) and the outputs of IC-14 settle down, does the ENABLE-2 signal enable AND gates IC-25 through IC-28 and AND gate IC-29. Thereafter, both sets of inputs to the comparator IC-30 are compared. Only if both sets of input signals A and B are equal will a signal be present at the input of the OR gate IC-48. The process from this point is the same as that described previously for the touch tone input signal.

The transducer 40 has two inputs, one a constant-voltage level coming from the SCR (signal J, FIG. 4), for triggering or activating external devices attached to the telephone call screener. The second input (signal K, FIG. 4) is a series of pulses generated by the astable oscillator IC-50 that sets on and off any suitable transducer, such as a bell, light, buzzer etc.

Thus, the telephone call screener can be used for screening incoming calls to discriminate between important calls and other calls, while keeping the caller unaware that calls are being screened. The screener is effective because it requires only knowledge of a two-digit secret code and can be activated by callers from either a touch tone or rotary dial telephone. The circuitry is relatively simple and achieves a compromise between low cost and effectiveness in a small package that is easy to install and operate.

TABLE OF COMPONENT VALUES

| COMPONENT | CAPACITORS | VALUE (μF) |
|---|---|---|
| C1 | | 10. |
| C2, C7, C10, C14, C16, C18, C19 | | 0.1 |
| C3, C9, C12, C20 | | 1.0 |

TABLE OF COMPONENT VALUES-continued

| C4 | 0.0047 |
|---|---|
| C5 | 10. 100V |
| C6, C17 | 57. |
| C8 | 36.4 |
| C11 | 2.2 |
| C13 | 250. |
| C15 | 107. |
| CF3, CF4, CF5 | 4.7 |

RESISTORS

| COMPONENT | VALUE (Ω · ¼W) |
|---|---|
| R1, R9, R13, R17, R28, R44, R47, R48 | 100.K |
| R2, R27, R29, R45 | 36.K |
| R3 | 10.K (variable) |
| R4 | 20.K (variable) |
| R5, R7 | 4.7K (variable) |
| R6 | 1.0K (variable) |
| R8 | 15.M |
| R10 | 270. |
| R11 | 1.3K |
| R12, R42, R43, R46 | 50K |
| R24 | 6.8K |
| R25 | 4.7K |
| R26 | 20.K |
| R30, R34 | 1.K |
| R31, R33 | 2.M |
| R32, R35 | 10.M |
| R36, R37, R38 | 75.M |
| R39, R40 | 24.K |
| R41 | 47.K |
| R50 | 150.K |

INTEGRATED CIRCUITS

| COMPONENT | PART NO. |
|---|---|
| IC-1 | National Semiconductor (NS) LM556 |
| IC-2 | Texas Instruments (TI) SN74123 |
| IC-3 | Intercil ICL8038 |
| IC-4 | (NS) LM556 |
| IC-5 | Signetics N74193 |
| IC-7 | Signetics N74193 |
| IC-8 | NS LM556 |
| IC-9 | Motorola MC14066B |
| IC-10 | NS LM3900 |
| IC-11 | NS LM3900 |
| IC-12 | NS LM3900 |
| IC-13 | NS LM3900 |
| IC-14 | TI SN74293 |
| IC-15 through IC-21 | Signetics NE567 |
| IC-22 | TI SN123 |
| IC-23 | TI SN123 |
| IC-25 through IC-28 | TI SN7408 |
| IC-29 | TI SN4708 |
| IC-30 | TI SN74L85 |
| IC-32 | TI SN74S188 |
| IC-32 | TI SN74S188 |
| IC-33 through IC-35 | TI SN7427 |
| IC-36 through IC-38 | TI SN7427 |
| IC-39 through IC-41 | TI SN7427 |
| IC-42 through IC-44 | TI SN7427 |
| IC-45, IC-46 | TI SN7422 |
| IC-47, IC-48 | TI SN7422 |
| IC-49 | TI SN74123 |
| IC-50 | NS LM556 |
| IC-51 | TI SN7404 |
| IC-52 | TI SN74123 |
| IC-53 | TI SN7404 |
| IC-54 | NS LM3900 |

What is claimed is:

1. Apparatus for screening telphone calls over a telephone line to a receiving telephone from an outside telephone havng a dial with selectable digits, comprising:
   means for detecting an incoming telephone call on the telephone line;
   means responsive to an output from the detecting means for producing a sequence of false calling tones over the telephone line simulating the periodic audible calling tone of a conventional telephone;
   means for receiving a first input generated by activating at least a selected one of the digits on the dial of the outside telephone only during a selected single silence gap in the false calling tone sequence;
   means for producing a second input representative of a secret code;
   means for comparing the second input with the received first input for producing an output when the first input matches the second input; and
   transducer means activated by the output from the comparing means for indicating the presence of a telephone call on the telephone line from a caller using the secret code.

2. Apparatus according to claim 1 including a touch tone decoder circuit, a rotary dial detector circuit, means for applying the first input to both the touch tone decoder circuit and the rotary dial detector circuit, and means for receiving outputs from either the touch tone decoder circuit or the rotary dial detector circuit for activating the transducer.

3. Apparatus according to claim 1 including means for adjusting the second input to indicate at least one selected digit on the telephone dial.

4. Apparatus according to claim 3 including means for selecting the silence gap during which the first input is received.

5. Apparatus according to claim 1 in which the detecting means includes means for automatically answering the incoming telephone call, the output from the detecting means activating the means for producing the false calling tones for placing the false calling tone sequence on the telephone line answered by the answering means.

6. Apparatus for screening telephone calls over a telephone line to a receiving telephone from an outside telephone havng a dial with selectable digits, comprising:
   means for producing on the telephone line a calling tone sequence;
   means for selecting a calling tone input only during a selected single silence gap in the calling tone sequence;
   means operative in response to the calling tone input for receiving a first input generated by activating at least a selected one of the digits on the dial of the outside telephone during the selected period;
   means for producing a second input representative of a secret code;
   means for comparing the second input with the first input for producing an output when the first input matches the second input; and
   transducer means activated by the output from the comparing means for indicating the presence of a telephone call on the telephone line from a selected caller.

7. Aparatus according to claim 6 including a touch tone decoder circuit, a rotary dial detector circuit, in which either the touch tone decoder circuit or the rotary dial detector circuit is able to receive the first input and compare it with the second input, and means for activating the transducer means with an output generated either by the touch tone decoder circuit or the rotary dial detector circuit.

8. Apparatus according to claim 6 including means for adjusting the second input to indicate at least one selected digit on the telephone dial.

9. Apparatus according to claim 8 in which the means for selecting the calling tone input is adjustable to vary the selected silence gap in the calling tone sequence.

10. Apparatus according to claim 6 in which the means for producing the calling tone sequence on the telephone line includes means for automatically answering an incoming telephone call on the telephone line and for activating a calling tone generator for producing the calling tone sequence on the answered telephone line.

11. Apparatus according to claim 6 in which the means for selecting the calling tone input is adjustable to vary the selected silence gap in the calling tone sequence.

12. Apparatus for screening telephone calls over a telephone line to a receiving telephone from an outside telephone to identify a telephone call from a caller using a secret X, Y code comprising:
- means for setting an X code representative of a selected one of several periods during a calling tone sequence;
- means for setting a Y code representative of a selected one of several digits on the dial of the outside telephone;
- means for detecting a telephone call present on the telephone line;
- means responsive to an output from the detecting means for producing a sequence of false calling tones over the telephone line simulating the periodic audible calling tones of a conventional telephone;
- means responsive to the setting of the X code for producing an enabling signal during the selected period within the false calling tone sequence;
- means operative in response to the enabling signal for comparing a Y input, generated by activating at least a selected one of the digits on the dial of the outside telephone, with the Y code for producing an output when the Y input matches the Y code; and
- transducer means responsive to the output of the comparing means for indicating the presence of a telephone call on the telephone line from a caller who has selected the secret X, Y code.

13. Apparatus according to claim 12 including means for generating the enabling signal only during a single silence gap in the false calling tone sequence.

14. Apparatus according to claim 12 including means for continuing to generate false calling tones even in the event the selected X, Y code has not been detected.

15. Apparatus according to claim 12 including means for setting a limit on the number of false calling tones generated.

16. Apparatus according to claim 15 including means for extending the limit on the number of false calling tones generated after the selected X, Y code has been detected.

17. Apparatus according to claim 12 including a touch tone decoder circuit for comparing the Y code with a frequency-dependent Y input;
- a rotary dial detector circuit for comparing the Y code with a pulse-dependent Y input;
- means for applying the enabling signal to both the touch tone decoder circuit and the rotary dial detector circuit; and
- means for applying the Y code input to either the touch tone decoder circuit or the rotary dial detector circuit for comparing the Y input with the Y code to produce an output when the Y input matches the Y code.

18. Apparatus for screening telephone calls over a telephone line to a receiving telephone from an outside telephone having a dial with selectable digits, comprising:
- means for automatically answering a telephone call on the telephone line;
- means for producing a calling tone sequence over the answered telephone line;
- means for receiving a first input generated by activating at least a selected one of the digits on the dial of the outside telephone during a selected one of several periods within the calling tone sequence;
- means for producing a second input representative of a secret code;
- means for comparing the first and second inputs to produce an output when the received first input matches the selected secret code, in which the telephone answering means activates a counter for counting the calling tones in said sequence and for generating the output when a selected period in the sequence is reached for enabling the received first input to be compared with the second input only during the selected period; and
- transducer means activated by the output from the comparing means to indicate the presence of a telphone call on the telephone line by a caller using the secret code.

19. Apparatus according to claim 18 including means for selectively adjusting the second input.

20. Apparatus according to claim 19 including means for selectively adjusting the period within the calling tone sequence that the first input can be received.

21. Apparatus according to claim 18 in which the telephone answering means is connected across the telephone line and activates the calling tone producing means when the telephone call on the telephone line is detected.

* * * * *

UNITED STATES PATENT AND TRADEMARK OFFICE
CERTIFICATE OF CORRECTION

PATENT NO. : 4,429,188
DATED : January 31, 1984
INVENTOR(S) : Thomas E. Allen

It is certified that error appears in the above-identified patent and that said Letters Patent is hereby corrected as shown below:

On the title page:

Section [76] Inventor: "Thomas E. Allen, 91 N. Mar Vista Avenue #5, Pasadena, California 91106" should read -- Thomas E. Allen, 818 Carlet Street, La Verne, California 91750 --

Column 6, line 43, change "couner" to -- counter --.

Column 7, line 34, delete "tive".

Column 7, line 45, delete the comma (second occurrence).

IN THE CLAIMS:

Column 9, line 62, change "havng" to -- having --.

Signed and Sealed this

Twentieth Day of August 1985

[SEAL]

Attest:

DONALD J. QUIGG

Attesting Officer     Acting Commissioner of Patents and Trademarks